Oct. 25, 1966  C. F. BENSON  3,281,191
ROLLER RADIAL THRUST BEARING
Filed March 3, 1964
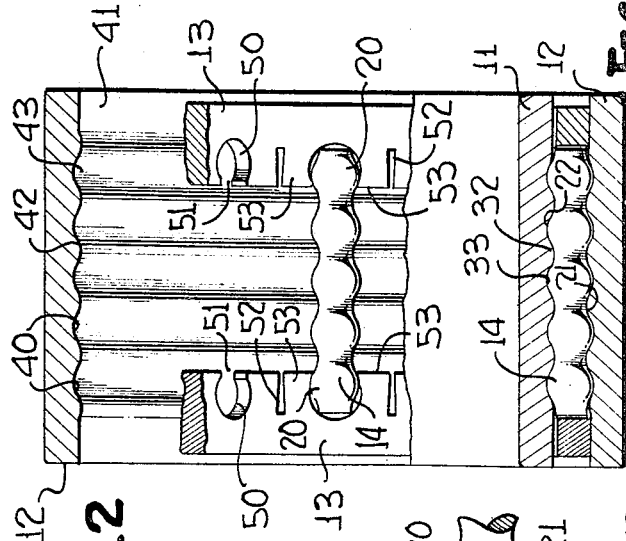
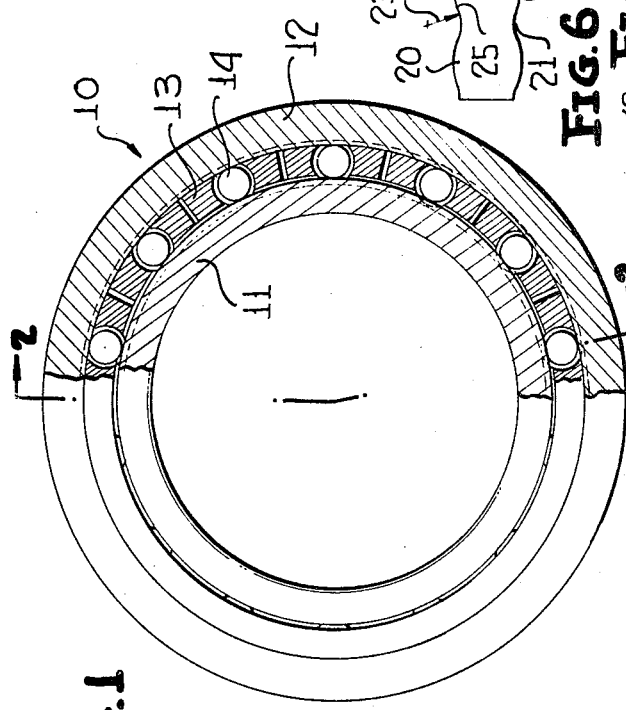
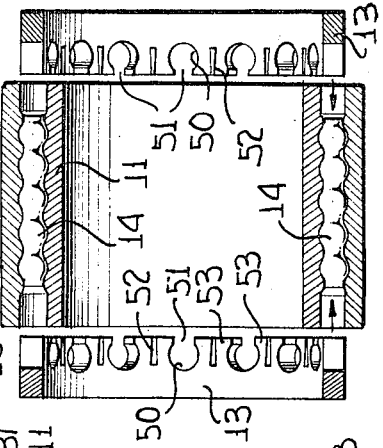
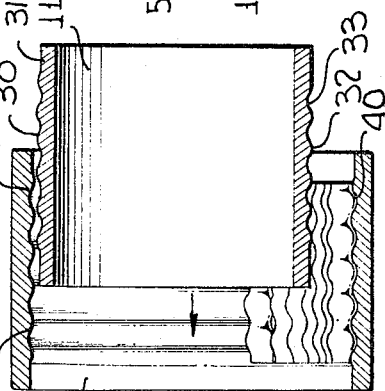
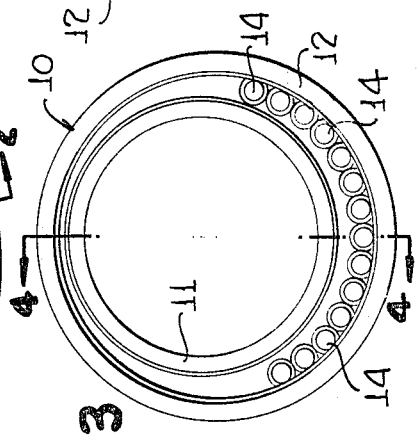
INVENTOR
CARL F. BENSON
BY
ATTORNEYS United States Patent Office 3,281,191
Patented Oct. 25, 1966

3,281,191
ROLLER RADIAL THRUST BEARING
Carl F. Benson, Torrington, Conn., assignor to The Torrington Company, Torrington, Conn., a corporation of Maine
Filed Mar. 3, 1964, Ser. No. 349,118
7 Claims. (Cl. 308—212)

This invention relates to a beaded roller radial thrust bearing assembly and more particularly to a roller bearing assembly which is designed to support radial and axial loads.

Various types of bearing assemblies have been previously devised which are capable of taking both radial and thrust loads. It is an object of this invention to provide a bearing assembly which includes inner and outer races and employs a plurality of rollers with beaded configuration as the rolling elements between the inner and outer races.

Another object of this invention is to provide a bearing assembly comprising an outer race and an inner race, a plurality of rollers and a pair of retainers for spacing the rollers and holding them in spaced relationship.

Another object of this invention is to provide a bearing assembly employing a heavy sectioned outer race having a plurality of grooves formed in the inner circumference for cooperating with a plurality of rollers each having a series of uniformly spaced nodes formed by alternating concave and convex portions.

Another object of this invention is to provide a beaded roller radial thrust bearing assembly comprising an outer race and an inner race, a plurality of rollers and a pair of retainers, the rollers being disposed between the outer race and the inner race, the rollers having a bead configuration at opposite ends thereof, and the retainers being provided with spaced slots therein for snapping the retainers onto the opposite ends of the rollers.

Another object of this invention is to provide a bearing asseembly, of the type set forth above, wherein each of the retainers is cylindrical and the slots which are formed therein are substantially cylindrical and each have an axis along a diameter of the cylindrical retainer.

Another object of this invention is to provide a bearing assembly, of the type set forth above, wherein a slit is formed in each of the retainers, between adjacent spaced slots, to provide the retainers with sufficient flexibility to permit the retainers to be snapped over the bead configuration at opposite ends of the rollers.

Another object of this invention is to provide a bearing assembly for supporting radial and axial thrust, the bearing assembly comprising an outer race and an inner race, a plurality of rollers and a pair of retainers, the rollers each having a series of uniformly spaced nodes formed by alternating concave and convex portions, the outer race and the inner race having inner and outer grooved surfaces, respectively, for cooperating with the concave and convex portions, the pair of retainers each having circumferentially spaced slots formed therein, the rollers each having one of the nodes adjacent each of the ends thereof and received within slots in the retainers whereby the rollers are held in spaced relationship to each other.

Another object of this invention is to provide a novel retainer for a bearing assembly, the retainer comprising a cylindrical tubular member, a plurality of substantially cylindrical slots formed in the retainer adjacent one edge thereof and spaced along the circumference of the retainer, the axes of the cylindrical slots being disposed in a plane normal to the longitudinal axis of the cylindrical tubular member.

Another object of this invention is to provide a novel retainer, of the type described above, wherein the axes of the cylindrical slots are disposed in a plane which is spaced inwardly from one edge of the retainer a distance which is slightly less than the length of the radius of the slots whereby an entrance is formed in the one edge contiguous with each respective slot.

A further object of this invention is to provide a novel retainer, of the type set forth above, wherein the retainer is provided with a slit between each of the slots so that the retainer is provided with sufficient flexibility to permit the retainer to be snapped onto a plurality of rollers in a bearing assembly.

With the above and other objects in view that will hereinafter appear, the nature of the invention will be more clearly understood by reference to the following detailed description, the appended claimed subject matter and the several views illustrated in the accompanying drawing.

In the drawing:

FIGURE 1 is an enlarged plan view, partially in section, and shows the novel bearing assembly in assembled form.

FIGURE 2 is an enlarged sectional view, taken on line 2—2 of FIGURE 1, with parts broken away to illustrate details of the novel retainers.

FIGURE 3 is a plan view and shows the bearing assembly in a partially assembled condition.

FIGURE 4 is a sectional view, taken on line 4—4 of FIGURE 3, and shows the manner in which the inner race is inserted within the outer race.

FIGURE 5 is a view similar to FIGURES 3 and 4 and shows a pair of retainer rings prior to engagement with the spaced rollers.

FIGURE 6 is an enlarged fragmentary view of one roller and shows the details thereof.

Referring to the drawing in detail, there is shown a bearing assembly, generally indicated by the numeral 10, which includes an inner race 11, an outer race 12, a pair of retainers 13 and a plurality of rollers 14.

As is shown in FIGURE 6, each of the rollers 14 has a bead configuration and includes a series of uniformly spaced nodes 20 formed by alternating concave portions 21 and convex portions 22. The concave portions 21 have an arc of curvature, indicated by the arrow 23, and the convex portions 22 have an arc of curvature, indicated by the arrow 24. It is preferable, but not limited thereto, that the arc of curvature 23 and the arc of curvature 24 have radii in the ratio of 1:2, and the arcs have a point of tangency as at 25.

The inner race 11 is of a cylindrical tubular form and has a series of grooves 30 formed in its outer circumference 31 by a plurality of spaced peaks 32 and a plurality of spaced valleys 33. It is apparent, that in the bearing assembly 10, the peaks 32 of the inner race 11 cooperate with the concave portions 21 of the rollers 14, while the convex portions 22 of the rollers 14 cooperate with the valleys 33 of the inner race 11.

The outer race 12 has a cylindrical tubular form and is provided with a plurality of spaced grooves 40 formed in the inner circumference 41 and including a series of alternately spaced peaks 42 and valleys 43. It is apparent that the grooves 40 and the rollers 14 are designed such that the peaks 42 of the outer race 12 cooperate with the concave portions 21 of the rollers 14, and the valleys 43 of the outer race 12 cooperate with the convex portions 22 of the rollers 14.

The manner in which the bearing assembly 10 is assembled will be apparent from a consideration of FIGURES 3, 4 and 5. The plurality of rollers 14 are properly positioned with respect to the grooves 40 in the outer race 12 and the inner race 11 is then moved, in the direction shown by the arrow in FIGURE 4, into eccentric relation with respect to the outer race 12. The rollers 14 are then equally spaced from each other, so as to position the inner race 11 concentric with the outer race 12, and then the pair of retainers 13 are positioned between the inner race 11 and the outer race 12 and snapped into engagement with the nodes 20 at the ends of each of the rollers 14 so as to maintain the rollers in properly spaced relation.

Each of the retainers 13 is preferably, but not necessarily, formed of brass and has a cylindrical tubular configuration. The retainers 13 have a circumferential thickness which is less than the diameter of the convex portions 22 of the rollers 14 such that the retainers 13 may be interposed between the inner race 11 and the outer race 12. The retainers 13 are race riding retainers; that is, the retainers 13 are in sliding contact with either the inner race 11 or the outer race 12 and are radially spaced from the other. The retainers 13 are illustrated as being in contact with the outer race 12 but it is to be understood that the retainers may also be designed to contact the inner race 11.

Each of the retainers 13 is provided with a plurality of circumferentially spaced substantially cylindrical openings or slots 50. The openings or slots 50 are formed adjacent the innermost edge of each of the retainers 13 by punching, drilling, moulding, grinding and the like, and are equally spaced along the circumference of the retainers 13 and are equal in number to the numbers of rollers 14. The axes of the openings or slots 50 are disposed in a plane normal to the longitudinal axis of each of the retainers 13, and the axes of the openings or slots 50 are spaced inwardly from the innermost edge of each of the retainers 13 by a distance slightly less than the length of the radius of the openings or slots 50 such that an entrance 51 is formed in the innermost edges of each of the retainers 13 contiguous with each of the respective openings or slots 50. The retainers 13 are also provided with a series of narrow slits 52, between adjacent openings or slots 50, to define a series of resilient fingers 53 which are adapted to snap onto the nodes 20 adjacent each of the ends of the rollers 14. Because of the spring action of the fingers 53, which spring action results from the provision of the narrow slits 52, the retainers 13 may be pressed endwise over the rollers 14 after they are properly spaced.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A beaded roller radial thrust bearing assembly comprising an outer race and an inner race, a plurality of rollers and a pair of retainers, said rollers being disposed between said outer race and said inner race, said rollers having a bead configuration at opposite ends thereof, and said retainers being provided with spaced radially open slot means therein for snapping said retainers onto the opposite ends of said rollers.

2. A beaded roller radial thrust bearing assembly comprising an outer race and an inner race, a plurality of rollers and a pair of retainers, said rollers being disposed between said outer race and said inner race, said rollers having a bead configuration at opposite ends thereof, and said retainers being provided with spaced slot means therein for snapping said retainers onto the opposite ends of said rollers, each of said retainers being cylindrical, said slot means being substantially cylindrical and each having an axis co-linear with a diameter of the cylindrical retainer and normal to the axis of said cylindrical retainer.

3. The bearing assembly as defined in claim 1 wherein a slit is formed in each retainer between adjacent spaced slots, and a series of resilient finger means located between respective slits and slots for snapping said retainers onto said bead configuration at a respective end of said rollers.

4. A bearing assembly for supporting radial and axial thrust, said bearing assembly comprising a tubular outer race and a tubular inner race, a plurality of rollers and a pair of retainers, said rollers each having a series of uniformly spaced nodes formed by alternating concave and convex portions, said outer race and said inner race having inner and outer grooved surfaces, respectively, for cooperating with said concave and convex portions, said pair of retainers each having circumferentially spaced slot means formed therein, said rollers having one of said nodes adjacent each of the ends thereof and received within said slot means in the retainers whereby the rollers are held spaced from each other.

5. A beaded roller radial thrust bearing assembly comprising a tubular outer race and a tubular inner race of equal axial length, a plurality of rollers and a pair of retainers, said rollers being disposed between said outer and inner races, and said retainers being provided with spaced slot means therein for snap engagement with an end of said rollers therein.

6. A bearing assembly as defined in claim 5 wherein said retainers are radially spaced from one of said races and in contact with the other of said races.

7. A bearing assembly for supporting radial and axial thrust, said bearing assembly comprising a tubular outer race and a tubular inner race of equal axial length, a plurality of rollers and a pair of annular retainers, said rollers each having a series of uniformly spaced nodes formed by alternating concave and convex portions, said outer race and said inner race having inner and outer grooved surfaces, respectively, for cooperating with said concave and convex portions, at least one of said retainers having circumferentially spaced substantially cylindrical slot means formed therein adjacent one edge thereof, the axes of said slot means being located in a plane normal to the longitudinal axis of said one retainer, said plane being spaced inwardly from one edge of said one retainer a distance slightly less than the length of the radius of said substantially cylindrical slot means whereby an entrance is formed in said one edge contiguous with each respective slot means, said rollers having one of said nodes adjacent one end thereof, said one retainer having radial slit means therein between adjacent slot means for defining resilient finger means on opposite sides of said entrance for snapping said one retainer over the one of said nodes adjacent one end of said rollers.

References Cited by the Examiner

UNITED STATES PATENTS

| | | | |
|---|---|---|---|
| 883,469 | 3/1908 | McKeel | 308—217 |
| 1,602,472 | 10/1926 | Woolgar | 308—217 |
| 2,016,526 | 10/1935 | Tyson | 308—217 |
| 2,273,895 | 2/1942 | Roterberg | 308—215 |
| 2,911,268 | 11/1959 | Stount | 308—201 |
| 3,146,039 | 8/1964 | Dunn | 308—201 |
| 3,157,443 | 11/1964 | Draudt | 308—201 |

FOREIGN PATENTS

| | | |
|---|---|---|
| 491,326 | 1/1927 | Germany. |
| 338,656 | 7/1959 | Switzerland. |

DAVID J. WILLIAMOWSKY, *Primary Examiner.*

FRANK SUSKO, *Examiner.*